US008762216B1

(12) United States Patent
Bhosle

(10) Patent No.: US 8,762,216 B1
(45) Date of Patent: Jun. 24, 2014

(54) DIGITAL LENDING OF PAYMENT INSTRUMENTS

(75) Inventor: Amit Bhosle, Bellevue, WA (US)

(73) Assignee: Amazon Technologies, Inc., Reno, NV (US)

( * ) Notice: Subject to any disclaimer, the term of this patent is extended or adjusted under 35 U.S.C. 154(b) by 594 days.

(21) Appl. No.: 12/750,865

(22) Filed: Mar. 31, 2010

(51) Int. Cl.
*G06Q 30/00* (2012.01)

(52) U.S. Cl.
USPC ........................................................ 705/26.1

(58) Field of Classification Search
USPC ........................................................ 705/26.1
See application file for complete search history.

(56) References Cited

U.S. PATENT DOCUMENTS

| | | | |
|---|---|---|---|
| 5,708,422 | A | 1/1998 | Blonder et al. |
| 5,794,207 | A | 8/1998 | Walker et al. |
| 5,953,710 | A | 9/1999 | Fleming |
| 5,960,411 | A | 9/1999 | Hartman et al. |
| 6,014,635 | A | 1/2000 | Harris et al. |
| 6,041,308 | A | 3/2000 | Walker et al. |
| 6,078,897 | A | 6/2000 | Rubin et al. |
| 6,085,169 | A | 7/2000 | Walker et al. |
| 6,105,000 | A | 8/2000 | Hickman et al. |
| 6,418,415 | B1 | 7/2002 | Walker et al. |
| 6,466,919 | B1 | 10/2002 | Walker et al. |
| 6,493,722 | B1 | 12/2002 | Daleen et al. |
| 6,553,346 | B1 | 4/2003 | Walker et al. |
| 6,609,106 | B1 | 8/2003 | Robertson |
| 7,099,840 | B1 | 8/2006 | Sullivan |
| 7,555,721 | B2 | 6/2009 | Wassom et al. |
| 2002/0120563 | A1* | 8/2002 | McWilliam et al. ............ 705/39 |
| 2004/0030654 | A1 | 2/2004 | Walker et al. |
| 2005/0021460 | A1* | 1/2005 | Teague et al. .................. 705/40 |
| 2005/0120053 | A1 | 6/2005 | Watson |
| 2008/0052226 | A1 | 2/2008 | Agarwal et al. |
| 2008/0177635 | A1 | 7/2008 | Handel |

OTHER PUBLICATIONS

"Word", Webster's Third New Intl Dictionary, Unabridged, 1993, Retrieved on Jul. 15, 2010 from: http://lionreference.chadwyck.com/searchFulltext.do? id =4026381 O&idT ype=offset&d ivLeve 1=2&q ue ryld = . ./sess io n/ 1279225667_6518&area=mwd &forward=refshelf&trai l=refshelf, 6 pgs.

Amazon Wishlist, "Create Holiday Wish List for your Kids", retrieved Nov. 26, 2007 at http://www.amazon.com/gp/gift-central/wishlist-for-kids, 3 pgs.

(Continued)

*Primary Examiner* — Mila Airapetian
(74) *Attorney, Agent, or Firm* — Lee & Hayes, PLLC

(57) ABSTRACT

A payment instrument may be borrowed by a designated lendee and used to complete a financial transaction when made accessible by a lender via a lender's account. The lender may restrict use of the payment instrument by the lendee, such as by restricting a duration of use, setting purchase limits, etc. In various aspects, the lender may loan the payment instrument to the lendee without providing a physical card, actual card number, or other personal information. In some aspects, the lendee may be presented with an option to use a borrowed payment instrument when completing a purchase using payment information that is linked to the lender. The lendee may perform a validation process to confirm his/her identity and complete a purchase. In some aspects, the lender may require an authorization before the payment is finalized, which may enable the lender to terminate a payment request.

22 Claims, 7 Drawing Sheets

(56) References Cited

OTHER PUBLICATIONS

Amazon.com—"Tell a Friend" button on an item detail page, retrieved Nov. 26, 2007 at http://www.amazon.com/gp/products/B0007ZF7EM/ref=amb_link_5526562_1?ie=UTF8, 7 pgs.

"Compare", Collins English Dictionary. London: Collins, 2000. Credo Reference (online) retrieved on Jun. 6, 2009 from <<http://www.credoreference.com/entry/hcengdict/compare>>, 1 pg.

Lending Club Blog, "Temporary Credit Card Numbers", Mar. 2009, retrieved Mar. 23, 2009 at http://blog.lendingclub.com/2009/03/23/temporary-credit-card-numbers, 4 pgs.

"Order", Collins English Dictionary, London: Collins, 2000. Credo Reference (online) retrieved on Jun. 6, 2009 from <<http://www.credoreference.com/entry/hcengdict/order, 2 pgs.

"Predetermine", Collins English Dictionary, London: Collins, 2000, (online) retrieved on Jan. 30, 2010 from http://www.xreferplus.com/entry/hcengdict/predetermine, 1 pg.

"Rule", Collins English Dictionary, London, Collins 2000. Credo Reference (online) retrieved on Jun. 6, 2009 from <<http://www.credoreference.com/entry/hcengdict/rule>>, 1 pg.

U.S. Appl. No. 11/548,111, filed Oct. 10, 2006, Agarwal et al.

Wikipedia, "Controlled Payment Number", retrieved Nov. 26, 2007 at http://en.wikipedia.org/wiki/Controlled_Payment_Number, 1 pgs.

\* cited by examiner

700 http://www.website.com/checkout

Checkout – Payment

Please select payment method:

Pay with existing card
○ Visa    Acct No. xxxx-xxxx-xxxx-1234    Name John Q. Example    Expiration Date 03 ▶ 2009 ▶

Pay with new card
○ [ ▶ ]

Pay with existing Bank Account
○ Jumbo Bank Card, DE    Acct No. *****123    Name John Q. Example    Driver's License / State E-123-456   WA ▶

Pay with new Bank Account
○ [ ▶ ]

Pay with Borrowed Payment Instrument
Lender Name    Nickname    Security
● Sue D. Example    My Credit Card    ****
○ Sue D. Example    My Gift Card

Pay with Other Payment Type
○ Retailer Credit Account     ○ Check or Money Order
○ Redeem Gift Card

[ Continue ]

702 — Pay with existing card
704 — Visa
706 — Pay with new card
708
710 — Pay with existing Bank Account
712
714 — Pay with Borrowed Payment Instrument
718 — Sue D. Example (My Credit Card)
716 — Sue D. Example (My Gift Card)
720
722
724 — Pay with Other Payment Type
726 — Continue

DIGITAL LENDING OF PAYMENT INSTRUMENTS

BACKGROUND

People are continually performing more financial transactions over communication lines than ever before due, in part, to an increased accessibility of communication devices. For example, people can execute financial transactions involving their financial accounts using personal computers connected to the Internet and/or using a smart phones connected to a mobile wireless network. In addition, a vast amount of consumable items and services are made available for purchase or other consumption in the marketplace, and particularly in electronic marketplaces via the Internet. Often, these consumable items and services can be purchased by securely transferring payment information over the communication lines. This payment method in turn continually reduces a percentage of cash and check transactions in the marketplace. Payments may be made using payment instruments (e.g., credit cards, bank accounts, etc.) that are accessible from one or more financial accounts.

Many merchants, financial institutions, and other businesses save payment and user information for user access at a later point in time. For example, a consumer may make a purchase from a host of an electronic marketplace. During the purchase, the host may allow the consumer to log into or create a financial (user) account. The host may then save payment information, shipping information, and other consumer data for later retrieval by the consumer. In this way the consumer may expedite future purchases by saving payment information and other personal information and avoiding re-entry of this information during a subsequent transaction.

Despite the convenience of these electronic forms of payment, many people have privacy concerns about the accessibility of the personal information and payment information. Most people are reluctant to provide payment information, such as credit card numbers, bank account number, etc., to a non-trustworthy source. Often, people are even reluctant to provide this information to trusted sources that may make the information susceptible to others that are less trust worthy. For example, a parent may be concerned that her child may make unsafe purchases on the Internet with non-trustworthy third parties when given access to his mother's credit card number, and thus expose the mother's credit card to fraudulent activity by the third party.

Despite the widespread accessibility of payment instruments, some people do not have payment instruments while other people possess payment instruments that include restrictions as to purchase amounts, geography (e.g., no international use), and so forth. Some people simply do not qualify for payment instruments, such as credit cards, due to age (e.g., young children), credit history, or for other reasons. Without payment instruments, these people face increased difficulty in performing transactions over communication lines such as the Internet.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

FIG. 6 is an illustrative interface of a payment account management page usable to lend payment instruments.

FIG. 7 is an illustrative interface of a payment page to enable a user to select a borrowed payment instrument for a requested payment.

DETAILED DESCRIPTION

Overview

Embodiments of the present disclosure are directed to, among other things, borrowed payment instruments that may be used to complete financial transactions (e.g., payments). In particular, the borrowed payment instruments may be used to purchase goods and/or services made remotely available, such as over a wide area network (e.g., the Internet) or available by another distributed communication. Payment instruments may include credit cards or debit cards types such as Visa®, MasterCard©, Diners Club®, American Express®, Discover®, or other credit cards or debit cards. Payment instruments may also include use of bank accounts (checking/savings, etc.), credit accounts, gift cards, purchase order funds, and so forth. As discussed above, some people do not have access to payment instruments or have payment instruments with restrictions. In some instances, it may be advantageous to enable a person ("the lender") with a payment instrument to allow secure use of the payment instrument (as a "borrowed payment instrument") by another person ("the lendee"), such as a child, friend, relative, spouse, business partner, etc. The lender may restrict use of the borrowed payment instrument by the lendee, such as by restricting duration of use, setting dollar amounts or quantity of purchase limits, restricting recipients of payments (payees), and so forth. In accordance with various embodiments, the lender may loan the payment instrument to the lendee without providing a physical card, actual card number, or other personal information.

The lendee may have convenient and ready access to the borrowed payment instrument once it is made available by the lender using the techniques disclosed herein. For example, the lendee may be presented with an option to use a borrowed payment instrument when completing a purchase using payment information that is linked to the lender. The lendee may perform a validation process, such as entering a security code or other security information to confirm his/her identity and complete a payment. In some embodiments, the lender may require an authorization before the payment is finalized, which may enable the lender to terminate a payment request. The lender may also have access to reports that detail or summarize use of the borrowed payment instrument.

The techniques and systems described herein may be implemented in a number of ways. Example implementations are provided below with reference to the following figures.

Illustrative Computing Environment

Figure 1:
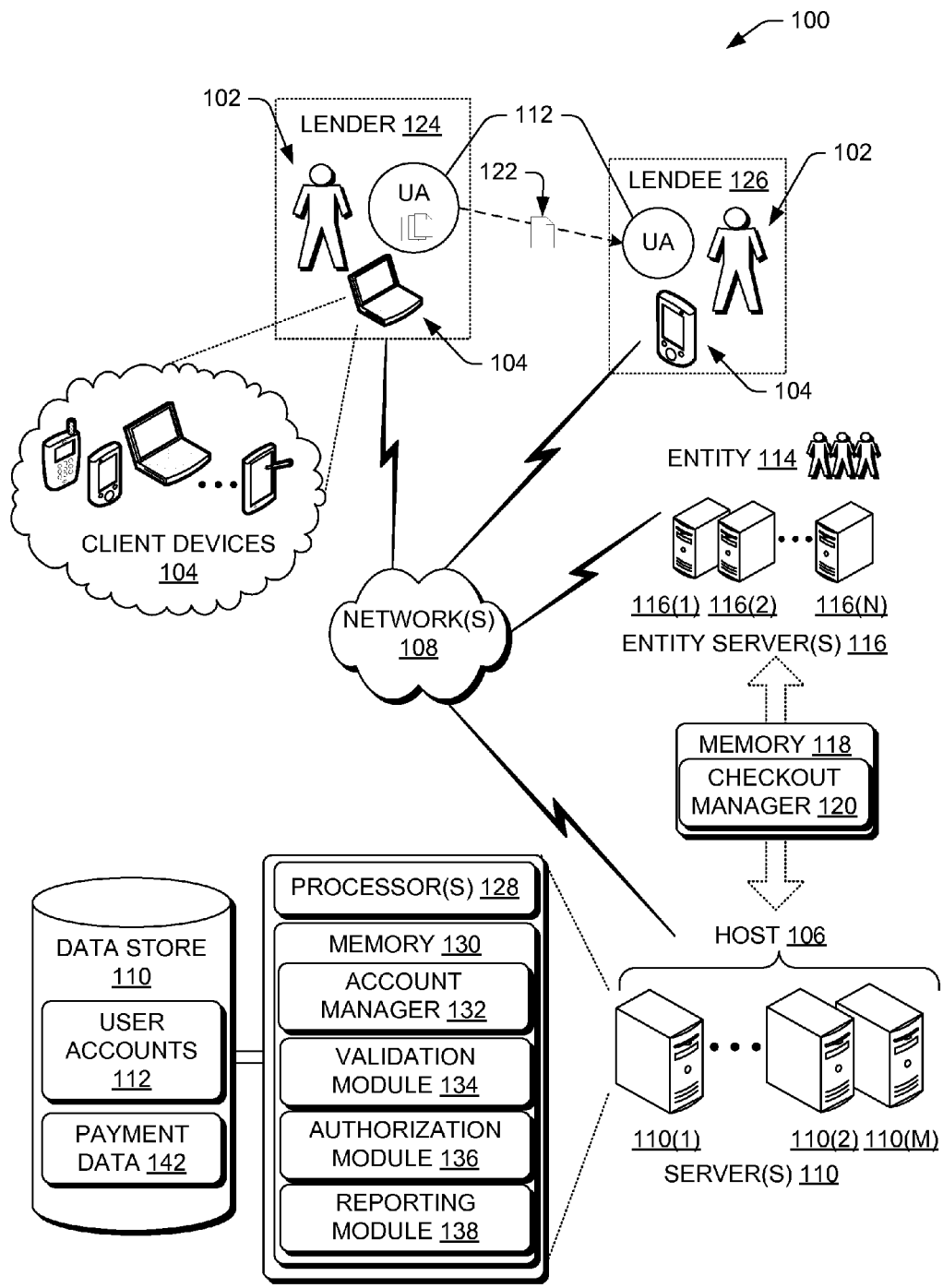
FIG. 1 is a schematic diagram of an illustrative computing environment configured to provide digital lending of payment instruments.

FIG. 1 is a schematic diagram of an illustrative computing environment 100 configured to provide digital lending of payment instruments. In the environment 100, users 102 are associated with client computing devices ("client devices") 104 that access a host 106 via network(s) 108.

The host 106 may comprise one or more servers 110(1), . . . , 110(M), perhaps arranged as a server farm. Other server architectures may also be used to implement the host 106. The host 106 is capable of handling requests from one or more users and serving, in response, various information and data to the client devices 104. The servers 110(1)-(M) include financial transaction servers capable of facilitating interaction initiated by the client devices 104 between the users 102 and user accounts 112 via the network 108. In this manner, the host 106 is representative of any host supporting user interaction with a payment service, including, for example, mobile payment services, online electronic payment services, and so forth.

The client devices 104 may be implemented in any number of ways. The client devices 104 may include wireless telephones (including smart phones), portable digital assistants (PDA), personal computers, tablet computers, or other computing devices that can exchange data with the host 106 via the network(s) 108. The network(s) 108 are representative of many different types of networks, such as cable networks, the Internet, local area networks, mobile telephone networks, wide area networks and wireless networks, or a combination of such networks.

In accordance with embodiments, the users 102 employ the client devices 104 to interact with the user accounts 112 residing on the host 106. In one scenario, the client device 104 sends a request to the servers 110(1)-(M). The request may be a uniform resource identifier (URI) request, a short message service (SMS) message, a multimedia messaging service (MMS) message, mobile instant messaging (MIM), email, or other type of request. Upon receiving the request, the servers 110(1)-(M) may return a message (or page, other communication, etc.) to the requesting client device 104, allowing the user to interact with the data provided by the servers 110(1)-(M). For example, a returned message may include information to enable the user 102 to engage in a payment transaction with an entity 114.

The entity 114 may be a business, an organization, a person, or any other entity capable of performing a financial transaction with the users 102. The entity 114 may host an electronic marketplace that offers goods and/or service for consumption by the users 102. The entity 114 may be associated with entity servers 116(1), . . . , 116(N) to enable interaction with the host 106 and/or the user 102 via the network(s) 108. In accordance with some embodiments, the users 102 may interact with the host 106 using the client devices 104 via an intermediary of the entity 114. For example, the users 102 may desire to purchase goods and/or services from the entity 114 using respective user accounts 112 stored by the host 106. The entity 114, upon receipt of payment information at least in part from the users 102, may interact with the host 106 to secure a payment from respective user accounts stored by the host. In some embodiments, the entity servers 116(1), . . . , 116(N) may include memory 118 to store a checkout manager 120 to process payments and interact with the host 106. However, in some embodiments, the checkout manager 120 may reside with the host 106, such as when the host provides checkout and payment processing services for the entity (e.g., outsourcing of checkout/payment).

In accordance with various embodiments, the host 106 may enable digital lending of a payment instrument 122 between a lender 124 and a lendee 126 of the users 102. The payment instrument 122 may be accessible via the user accounts 112. In this way, the lender 124 may designate the payment instrument as a borrowed payment instrument that is lent to the lendee 126. The lendee 126 may then use the borrowed payment instrument to perform transactions in accordance with any restrictions and/or authorizations imposed by the lender 124.

As illustrated, the servers 110 are equipped with one or more processors 128 and memory 130. The memory 130 may include applications, modules, and/or data. In some embodiments, the memory 130 may include one or more of an account manager 132, a validation module 134, an authorization module 136, and a reporting module 138. The servers 110 may also communicate with a data store 140 that stores data such as the user accounts 112 and payment data 142. In some embodiments when the host 106 includes the checkout manager 120, the checkout manager 120 may be stored by the server(s) 110 in the memory 118.

The account manager 132 may enable the users 102 to access respective user accounts 112, designate the borrowed payment instrument 122 and otherwise view and modify account details. The account manager 132 may also enable the lender 124 to create restrictions on the usage of the borrowed payment instrument by the lendee 126. The restrictions may include a predetermined duration of available use, dollar amount limits, quantity of transactions, restrictions of recipients of payments (payees), and so forth.

The validation module 134 may validate the lendee 126 as having access to the borrowed payment instrument of the lender 124. The validation module 134 may enable generation and/or selection of a security code by the lender 124. The lender 124 may supply the lendee 126 with a security code that enables the lendee to use the borrowed payment instrument 122 at an authorized entity, such as the entity 114. When the lendee 126 selects the borrowed payment instrument 122 and enters a valid security code, the entity 114 may accept the borrowed payment instrument after validation by the validation module 134. In this way, the validation module 134 may validate the security code and implement security protocols that protect payments from fraud or improper redemption activities by the lendee 126 or other users.

The authorization module 136 may transmit messages between the entity 114 and the lender 124 to enable the lender to authorize a purchase by the lendee 126. For example, the lender 124 may wish to authorize payment requests from the lendee 126 before payment is issued in a transaction. When the lendee 126 initiates a payment to the entity 114, the lender 124 receives a message (authorization request), which when approved, completes the payment. When the authorization request is denied or expires, the payment may be denied by the host 106. The validation module 134 and/or the authorization module 136 may be components of a fraud and risk management process or system employed by the host 106.

The reporting module 138 may generate and provide reports to the lender 124 and/or the lendee 126 based on the lendee's use of the borrowed payment instrument 122.

In accordance with some embodiments, the host 106 may perform some or all of the operations of the entity 114. For example, the host 106 may also host an electronic marketplace that provides goods and services for consumption. The host 106 may allow the users 102 to manage the user accounts 112 that may be used to make purchases from the electronic marketplace.

Illustrative Operation

Figure 2:
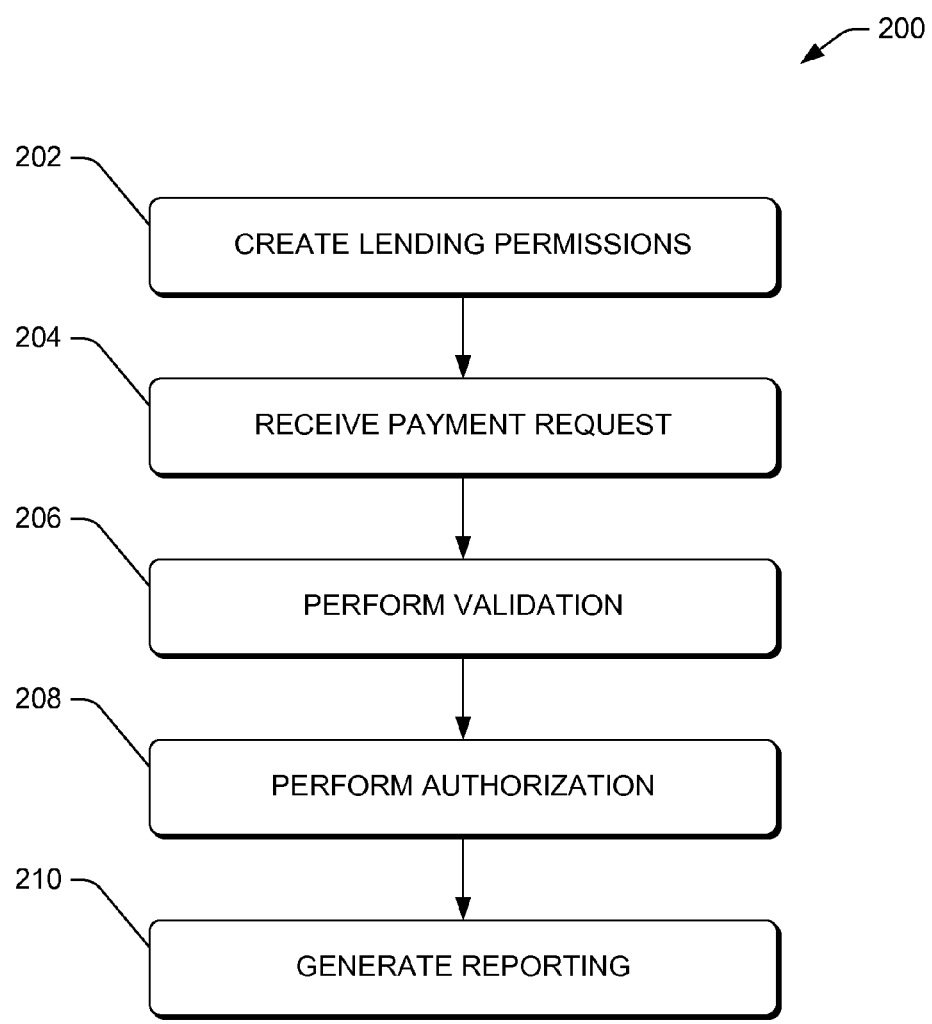
FIG. 2 is a flow diagram of an illustrative process of providing digital lending of payment instruments.

FIG. 2 is a flow diagram of an illustrative process 200 of providing digital lending of payment instruments. The process 200 is illustrated as a collection of blocks in a logical flow graph, which represent a sequence of operations that can be implemented in hardware, software, or a combination thereof. The collection of blocks is organized under respective entities that may perform the various operations described in the blocks. In the context of software, the blocks represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described throughout this disclosure, in addition to process 200, shall be interpreted accordingly. The operations of process 200 are described with reference to the environment 100. The operations of process 200 may be performed, at least in part, by the various modules of the host 106.

At 202, the account manager 132 may be used to determine lending permissions. For example, the lender 124 may access her user account 112 to make one or more payment instruments available for use by the lendee 126. The lender 124 may select payment instrument(s) for lending, create restrictions, select or generate a security code for a validation process, and perform other relevant actions. The lender 124 may communicate the security code to the lendee 126, typically using a secure communication means such as a voice communication.

At 204, the validation module 134 may receive a payment request when the lendee 126 attempts to use the borrowed payment instrument. In accordance with some embodiments, the validation module 134 may receive the payment request from the lendee via the entity 114. For example, the lendee 126 may use the borrowed payment instrument 122 to complete a transaction with the entity 114. In some instances, such as when the host 106 offers an electronic marketplace, the lendee 126 may transact directly with the host 106. In another example, the lendee 126 may transfer a payment via the host 106 to the entity 114, such as to perform a money transfer.

At 206, the validation module 134 may validate the payment request that is received at 204. The validation module 134 may verify an authenticity of a security code. In some embodiments, the validation module 134 may determine whether any restrictions on the use of the borrowed payment instrument 122 have been satisfied by analyzing information of the use of the borrowed payment instrument (e.g., transaction data).

At 208, the authorization module 136 may perform an authorization when requested by the lender 124. For example, the lender 124 may select an authorization option using the account manager 132 to request authorization for some uses of the borrowed payment instrument 122 by the lendee 126. In such instances, the authorization module 136 may interact with the lender 124 to determine whether authorization is granted for the payment request at 204. The lender 124 may then either approve or deny the payment request.

At 210, the reporting module 138 may generate and transmit one or more reports to the lender 124 and/or the lendee 126 based on the usage of the borrowed payment instrument 122.

Figure 3:
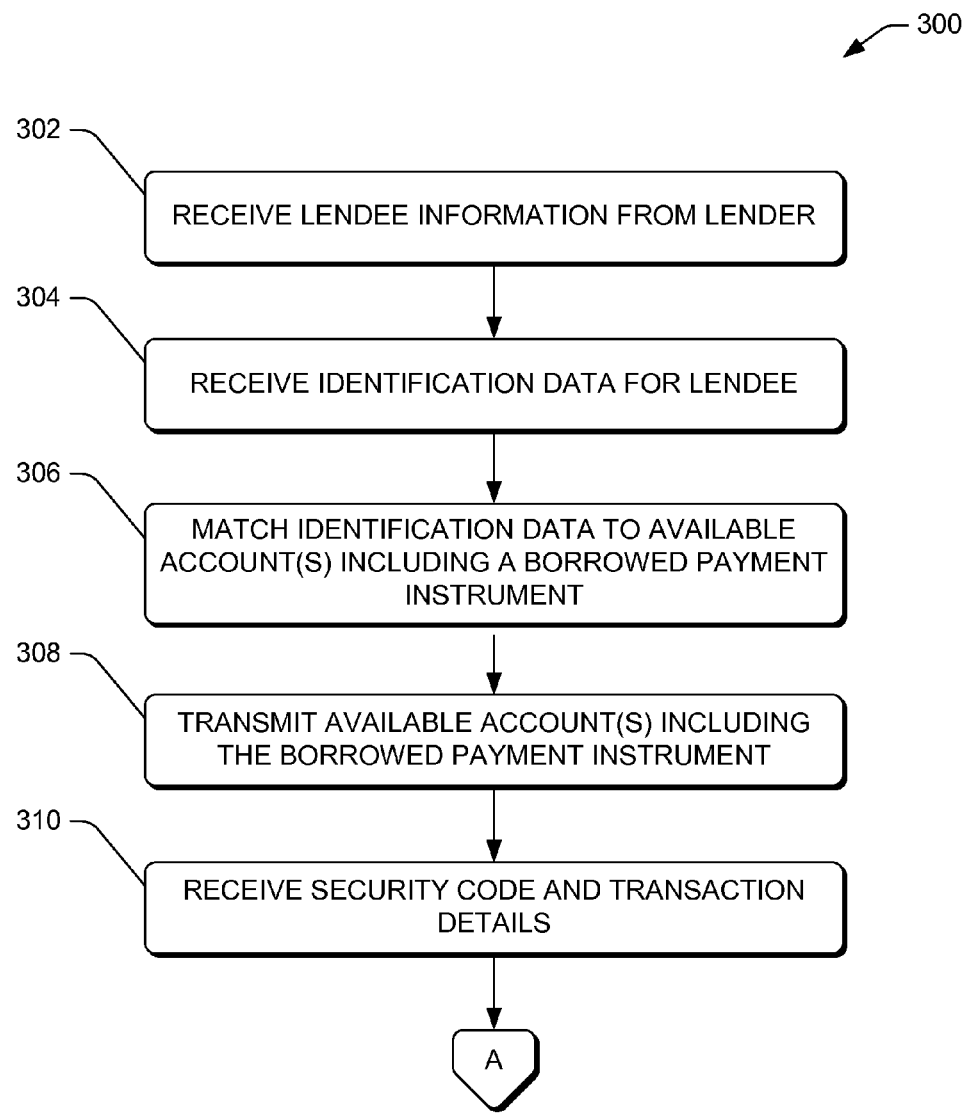
FIG. 3 is a flow diagram of an illustrative process to enable use of a borrowed payment instrument to satisfy a payment request.
Figure 4:
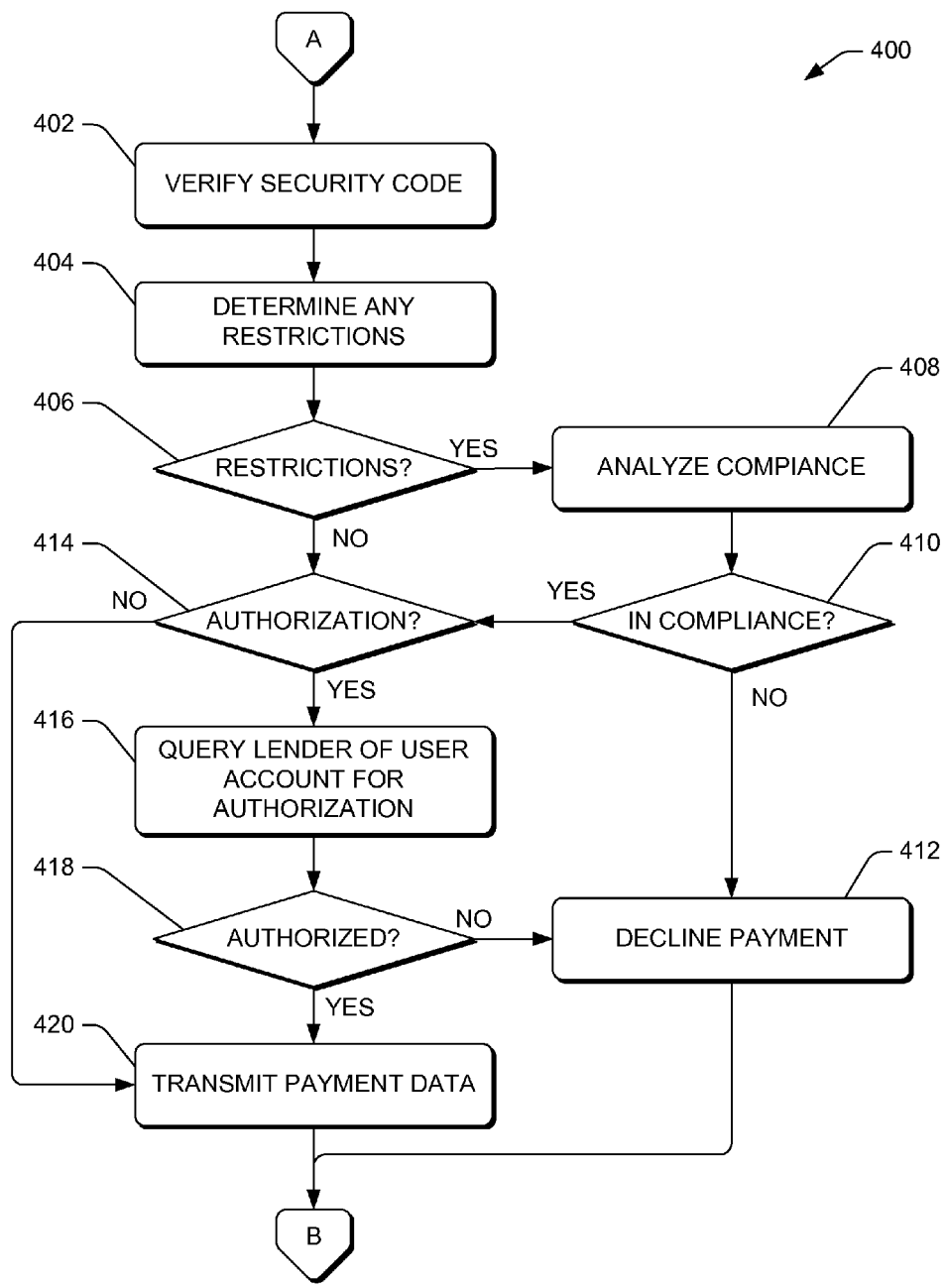
FIG. 4 is a flow diagram of an illustrative process to validate a borrowed payment instrument used in a payment transaction.
Figure 5:
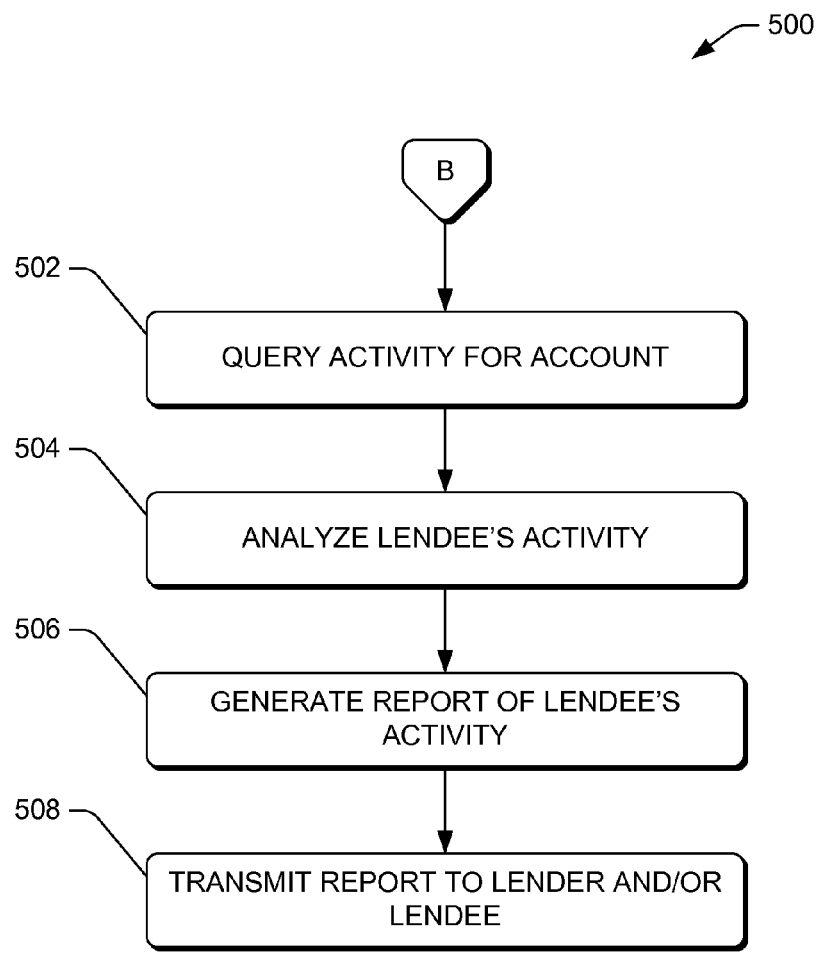
FIG. 5 is a flow diagram of an illustrative process to report account activity of a borrowed payment instrument to an interested party of the borrowed payment instrument.

FIGS. 3-5 provide further details of various embodiments of the operations of the process 200. Similar to FIG. 2, the order in which the operations of FIGS. 3-5 are described is not intended to be construed as a limitation, and any number of the described blocks can be combined in any order and/or in parallel to implement the process. The operations of the processes described in FIGS. 3-5 may be performed, at least in part, by the various modules of the host 106 and are described with reference to FIGS. 1 and 2.

FIG. 3 is a flow diagram of an illustrative process 300 to enable use of a borrowed payment instrument to satisfy a payment request.

At 302, the account manager 132 may receive lendee 126 information from the lender 124. For example, the lender 124 may log into a respective user account 112 of the lender and select one or more payment instruments that may be designated as borrowed payment instruments. While logged into the user account 112, the lender 124 may provide the lendee's name, contact information, and other relevant information to enable secure lending of the payment instrument 122. In some embodiments, a portion of the lender's information may be associated with the borrowed payment instrument, such as the lender's address. In this way, the lendee may be limited to using the payment instrument 122 in association with the lender's address, such as for shipping purposes and validation of the borrowed payment instrument.

In some embodiments, the lendee 126 may initiate borrowing of the payment instrument 122. For example, the lendee 126 may contact the lender 124, via a direct communication or via an intermediary such as a retailer (e.g., the entity 116, etc.). The lendee 126 may request to borrow the payment instrument 122, which may then be lent via the operation at 302. In various embodiments, the entity 116 may facilitate linking the lendee 126 and the lender 124 to enable receipt of the lendee information by the lender. For example, the entity 116 may collect information from the lendee 126 for transmission to the lender for use in establishing the borrowed payment instrument at 302.

At 304, the account manager 132 may receive identification data from the lendee 126 during a usage of the payment instrument 122, such as from the entity 114. For example, at a checkout page of an electronic marketplace, the checkout manager 120 may receive lendee information that enables the entity 114 (or the host 106) to accesses payment data to provide payment options on the checkout page.

At 306, the account manager 132 may match the identification data to the lender's account, which in turn may indicate the lendee's access to the borrowed payment instrument 122. If the lendee has his/her own accounts and payment instruments, the account manager 132 may also transmit those accounts to the checkout manager 120.

At 308, the account manager 132 may transmit available account(s) to the checkout manager 120, which includes the borrowed payment instruments. In some instances, more than one payment instrument may be available for use by the lendee such as when the lender enables use of multiple payment instruments.

In some embodiments, the host 106 may provide the checkout page. The payment options may include the borrowed payment instrument 122 that the lendee may use to pay for any goods and/or services included in a transaction. The checkout manager 120 may enable a website operator (or the host 106 when the checkout manager is implemented on the host) to add or remove payment types from the checkout page. When presenting the checkout page, the checkout manager 120 may retrieve any available payment instruments associated with the lendee from the account manager 132. In this way, the borrowed payment instrument may be presented to the lendee as a mechanism to complete a pending purchase without the lendee having to input any account numbers of the borrowed payment instrument. The lendee may be prompted by the checkout manager 120 to enter validation information (e.g., the security code) to complete the transaction.

At 310, the validation module 134 may receive the security code and transaction details from the checkout manager 120. The checkout manager 120 may then transmit the identification data of the lendee to the validation module 134. In addition, the checkout manager 120 may transmit details of the transaction, which may be used by the validation module 134 to determine whether the payment request is in compliance with any restrictions associated with use of the borrowed payment instrument.

FIG. 4 is a flow diagram of an illustrative process 400 to validate a borrowed payment instrument used in a payment transaction. The process 400 may proceed from the process 300 via a flow connection "A".

At 402, the validation module 134 may determine whether the security code is valid. In some embodiments, the security code may be encrypted by the checkout manager 120 and thus require decryption by the validation module 134 upon receipt. In the event that the security code is invalid, the lendee 126 may be able to resubmit the security code for up to a predetermine number of submissions (attempts).

At 404, the validation module 134 may determine whether any restrictions are imposed by the lender 124 on the borrowed payment instrument 122. When restrictions, such as dollar amounts, a predetermined duration of use, or other restrictions are present, the validation module 134 may analyze compliance with the restrictions at 408. The validation module 134 may use the transaction details received at 310 in the analysis. At 410, the validation module 134 may determine, based on the analysis, whether the use of the borrowed payment instrument 122 is in compliance with any restrictions placed on the use of the borrowed payment instrument. When the validation module 134 determines the requested use of the borrowed payment instrument is not in compliance with one or more restrictions, the validation module may decline payment at 412. However, when the validation module 134 determines the requested use of the borrowed payment instrument is in compliance with all restrictions at 410, or no restrictions are imposed on the borrowed payment instrument at 406, then the process 400 may proceed to a decision operation 414.

At 414, the authorization module 136 may determine whether the requested use of the borrowed payment instrument 122 requires authorization by the lender 124 before payment is issued on behalf of the lendee 126. For example, the lender 124 may have selected an authorization option when designating the payment instrument for use by the lendee 126 via the account manager 132.

At 416, the authorization module 136 may query the lender 124 of the borrowed payment instrument 122 to determine whether the lender approves or declines authorization. For example, the authorization module 136 may transmit a communication to the lender 124 via email, text message, voice call, etc. The lender 124 may then respond during the first communication, or during a subsequent communication within a prescribed time limitation, to authorize or decline the request. In some embodiments, a lapse of the prescribed time limitation may result in a decline of a pending request. In various embodiments, the authorization module 136 may request identification information from the lender 124, such as a personal identification number (PIN) before allowing the lender to approve a pending request.

At 418, the authorization module 136 determines whether the request is authorized based on an activity of the lender 124 (e.g., approve/decline) or by inaction of the lender and passage of the prescribed time limitation, which may result in a decline of payment (or in some instances an approval based on parameters of the borrowed payment instrument 122 as established by the account manager 132 and/or the lender 124). When the authorization module 136 determines the authorization request is declined, then the payment is declined at 412.

At 420, the account manager 132 may transmit payment in response to a requested use of the borrowed payment instrument 122. The payment transmission at 420 may be imitated in response to an authorized (approve) decision at the decision operation 418, or following the decision operation 414 when no authorization is required in response to the request.

In accordance with some embodiments, the operations 310 and 402 that involve the security code transmission and verification, respectively, and/or the operations 416 and 418 that involve authorization and verification, respectively, may occur during a portion of transactions involving the payment instrument 122. For example, the use of the security code and/or the authorization may occur for only the first transaction to establish ownership of the payment instrument, for all transactions, for all transactions that reach a threshold value (e.g., exceed a predetermined dollar amount, etc.), or for transaction selected on a random basis to prove identity of the lendee 126, etc. In some instances, when the lendee 126 enters the security code in a secure environment (password protected checkout environment, etc.), then it may not be practical to require the lendee to repeatedly supply the security code for each subsequent use of the payment instrument in the secure environment.

FIG. 5 is a flow diagram of an illustrative process 500 to report account activity of a borrowed payment instrument to an interested party (e.g., the lender 124, the lendee 126, etc.) of the borrowed payment instrument. The process 500 may proceed from the process 400 via a flow connection "B".

At 502, the reporting module 138 may query activity for a user account that has a borrowed payment instrument. The reporting module 138 may query the payment data 142 randomly or periodically or the reporting module may perform the query in response to a trigger from the account manager 132 based on account activity (e.g., a payment at 420).

At 504, the reporting module 138 may analyze activities of the lendee 126 using the borrowed payment instrument 122. For example, the reporting module 138 may categorize activities by time periods, by location, or by other categories.

At 506, the reporting module 138 may generate a report of activity of the lendee 126 based on use of the borrowed payment instrument 122. The report may include categorization of use of the borrowed payment instrument based on the operation 506.

At 508, the reporting module 138 may transmit the report to the lender 124 and/or the lendee 126. In some embodiments, the report may be different for the lender 124 than for the lendee 126, such as by including more or fewer pieces of information. The report may be transmitted via available communications such as email, text messaging, printed report, a website, available via the account manager 132 by logging into a respective user account, and so forth.

Illustrative Interfaces

Figure 6:
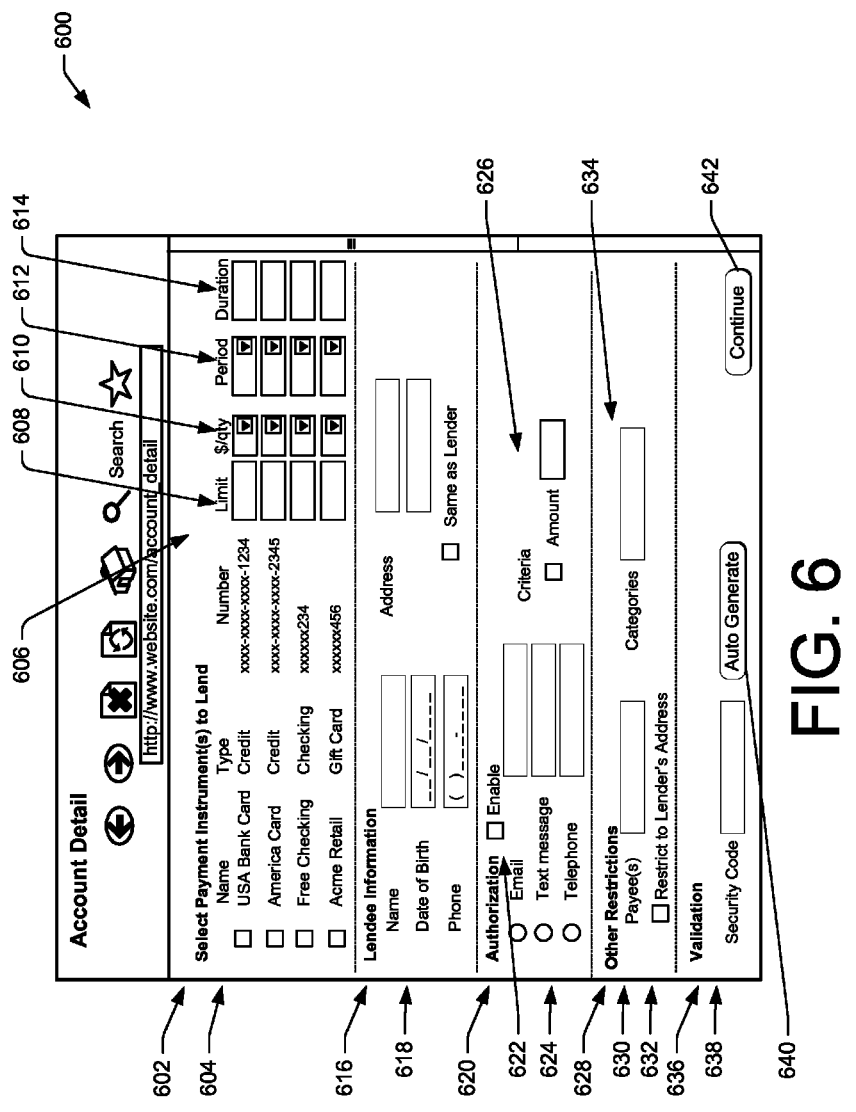

FIG. 6 is an illustrative interface 600 of a payment account management page usable to lend payment instruments. The interface 600 may allow the users 102, such as the lender 124 and/or the lendee 126 to interact with a respective one of the user accounts 112 via the account manager 132. The interface 600 is presented for illustrative purposes and other interface configurations may be used to perform some or all of the techniques described herein of digital lending of payment instruments. For example, more or fewer options may be present in other interfaces while remaining within the scope of this disclosure.

A payment instrument section 602 may enable the lender 124 to select one or more payment instruments from a list 604 for lending to the lendee 126. The list 604 of payment instruments may be generated based on payment instruments previously used by the lender 124 and/or by payment instruments added to the user account. In some embodiments, the payment instrument section 602 may also enable the lender 124 to add a new payment instrument, which may also be selected by the lender 124 for use by the lendee 126.

Upon selection of a payment instrument, the interface 600 may also enable the lender 124 to set restrictions 606 on use of each payment instrument. A limit 608 may be imposed based on a given qualifier 610. The qualifier 610 may indicate whether the limit 608 is a dollar amount or a quantity amount (among other possible options (e.g., percentage, etc.). A period 612 may be set to a period of time (e.g., a day, a week, etc.) or be set to "none". Thus, using the limit 608, the qualifier 610, and the period 612, the lender 124 could restrict use of the selected payment instrument to "$100 a day," "3 uses per week," and so forth. A duration 614 enables selection of beginning and end dates/times when the payment instrument is available to the lendee 126. In some embodiments, the duration 614 may only include an end date/time. For example, when a duration is set, a payment request after an expiration of the duration would be determined to be non-compliant at 410 in the process 400 and result in a declined payment at 412.

A lendee section 616 may enable the lender 124 to specify the lendee 126 that has access to the borrowed payment instrument 122. The lendee section 616 may include various lendee information 618, such as without limitation a name, date of birth, telephone number, and/or address. In some instances only a portion of the lendee information 618 may be necessary to match a lendee to the user account of the lender 124. For example, the lender 124 may specify that the lendee has to use the lender's address in a payment transaction involving the borrowed payment instrument. In this way, the checkout manager may link the lender's address to the borrowed payment instrument during an ensuing financial transaction with the lendee 126, thus restricting the lendee to use of the lender's address.

An authorization section 620 may allow the lender 124 to enable, via an enable option 622, authorization controls that may influence the lendee's usage of the borrowed payment instrument 122. The lender 124 may specify communication information 624 to facilitate providing an authorization and/or criteria 626 as to when an enabled authorization process will take place. For example, the lender 124 may specify that payments of $50 or greater may require an authorization, although other amounts, quantities, and/or metrics may be used as the authorization criteria.

A restrictions section 628 may enable the lender 124 to set further restrictions on the usage of the borrowed payment instrument 122 by the lendee 126. In some embodiments, the restrictions may include a payee restriction 630 that allows the lender to restrict or deny transactions with specified payees (via the checkout manager 120). An address restriction 632 may limit shipping items to addresses other than to an address of the lender 124. A categories restriction 634 may restrict or deny transactions of goods/services in specified categories. For example, the lender 124 may limit use of the borrowed payment instrument 122 to purchases of groceries, etc.

A validation section 636 may enable the lender to set a security code 638 as added security in use of the borrowed payment instrument. The security code 638 may then be communicated to the lendee 126, preferable via a verbal or otherwise secure communication, so that the lendee 126 can use the security code during an ensuing financial transaction as shown in 310 and 402. An auto generate function 640 may be used to generate a random instance of the security code 638. When the lender 124 has completed filling out the account details on the interface 600, a continue button 642 may save details and initiate lending of the borrowed payment instrument 122.

FIG. 7 is an illustrative interface 700 of a payment page to enable a user (e.g., the lendee 126) to select a borrowed payment instrument for a requested payment. The interface 700 may allow the users 102, such as the lendee 126, to interact with the checkout manager 120 and select the borrowed payment instrument 122 during a financial transaction. The interface 700 is presented for illustrative purposes and other interface configurations may be used to perform some or all of the techniques described herein of digital lending of payment instruments. For example, more or fewer options may be present in other interfaces while remaining within the scope of this disclosure.

Generally, the interface 700 may present the lendee 126 with one or more options of payment. In some instances, the lendee 126 may have existing payment options (existing accounts that may be used for payment); however, existing accounts are not necessary.

An existing credit card section 702 may list existing card(s) 704 and an entry option 706 to enter a new payment instrument. An existing bank account section 708 may list existing bank account(s) 710 and an entry option 712 to enter a new bank account payment instrument.

A borrowed payment instrument section 714 may list any borrowed payment instruments made available to the lendee 126. The checkout manager 120 may populate the borrowed payment instrument section 714 with existing borrowed payments 716 when the checkout manager 120 interacts with the account manager 132 to identify the payment instrument 122 that is borrowed as explained in the process 300. The borrowed payment instrument section 714 may include a lender name 718 associated with each borrowed payment instrument 716, a nickname 720 (or other account identifier such as a number, etc.), and/or an entry box 722 for the lendee 126 to enter the security code 638 that is established using the account manager 132.

The interface 700 may also enable the lendee 126 to complete a financial transaction using various other payment instruments in an additional payment type section 724. The lendee 126 may select a continue button 726 to initiate use of the selected payment type, such as the borrowed payment instrument 122 that may be selected from the borrowed payment instrument section 714.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

What is claimed is:
1. A method of lending a payment instrument, the method comprising:
associating a payment instrument and a security code with a lendee based at least in part on a designation of the lendee by a lender, the payment instrument made available for the lendee to make a payment on behalf of the lender and the security code to enable the lendee to validate the payment instrument;

receiving a payment request from an entity based at least in part on a payment transaction with the lendee, the payment request including transaction details that link the lendee to the payment instrument;

transmitting an identifier of the payment instrument to the entity along with at least one other identifier of another payment instrument available to the lendee for selection by the lendee during the payment transaction;

receiving the security code from the entity based at least in part on an input provided by the lendee during the payment transaction, the security code being used in lieu of an account number of the payment instrument to validate use of the payment instrument; and denying the payment request to use the payment instrument when the security code is invalid for the payment instrument.

2. The method as recited in claim 1, further comprising receiving one or more restrictions that are imposed on use of the payment instrument.

3. The method as recited in claim 2, further comprising analyzing the transaction details for compliance with the one or more restrictions.

4. The method as recited in claim 1, further comprising:

transmitting an authorization query to the lender in response to the receiving of the security code from the entity, the authorization query to enable the lender to approve or deny the payment request; and fulfilling the payment request using the payment instrument when the security code is valid for the payment instrument and the authorization query includes an approval of the payment request.

5. The method as recited in claim 1, further comprising reporting the payment transaction to the lender.

6. The method as recited in claim 4, further comprising denying the payment request based on inaction of the lender and a lapse of a prescribed time limitation after the transmitting the authorization query to the lender.

7. A method, comprising:

designating a payment instrument in a user account of a lender as a borrowed payment instrument for use by a lendee, the borrowed payment instrument having restrictions of use by the lendee imposed by the lender;

receiving lendee information during a checkout process;

identifying the borrowed payment instrument as a payment option for the lendee based at least in part on the lendee information, the payment option included within a plurality of payment options for selection by the lendee in the checkout process, the plurality of payment options comprising at least one payment instrument available to the lendee;

receiving a payment request initiated by the lendee to use the borrowed payment instrument in the checkout process;

in response to the receiving the payment request, transmitting an authorization request to the lender to prompt the lender to approve or deny the payment request;

approving the payment request at least partially in response to determining that the payment request is in compliance with the restrictions of use imposed by the lender and that the authorization request includes an approval of the payment request; and denying the payment request at least partially in response to determining that the payment request fails to comply with the restrictions of use imposed by the lender or that the authorization request has expired or includes a denial of the payment request.

8. The method as recited in claim 7, further comprising designating a security code to be associated with the borrowed payment instrument, the security code to enable the lendee to use the borrowed payment instrument without providing an account number of the borrowed payment instrument.

9. The method as recited in claim 7, wherein the restrictions of use include at least one of a dollar amount limit or a duration during which the lendee can use the borrowed payment instrument.

10. The method as recited in claim 7, wherein the authorization request is transmitted to the lender via at least one of email, text message, or voice call.

11. The method as recited in claim 7, wherein the authorization request is transmitted when the payment request reaches or exceeds a threshold dollar amount.

12. The method as recited in claim 7, wherein the receiving the payment request initiated by the lendee includes receiving a security code and transaction details including at least one of a payee, a dollar amount of the payment request, or a description of goods or services involved in a transaction associated with the payment request.

13. The method as recited in claim 12, wherein the approving the payment request is further contingent upon the receipt of the security code associated with the borrowed payment instrument.

14. The method as recited in claim 12, wherein the transaction details are compared to the restrictions of use to determine whether to approve or deny the payment request.

15. One or more non-transitory computer-readable media storing computer-executable instructions that, when executed on one or more processors, perform acts comprising:

receiving, from a checkout manager, identification information of a first user involved in a transaction, the identification information used to link the first user to a plurality of available payment instruments;

associating the first user to a borrowed payment instrument based at least in part on the identification information, the borrowed payment instrument being a payment instrument of a second user who has designated the first user a restricted use of the borrowed payment instrument;

transmitting to the checkout manager an identifier for the borrowed payment instrument along with at least one other identifier of another payment instrument available to the first user for selection by the first user during the transaction;

in response to a selection of the identifier for the borrowed payment instrument, transmitting an authorization query to the second user to enable the second user to approve or deny the transaction; and approving the transaction at least partially in response to determining that the second user approves the transaction via the authorization query.

16. The one or more non-transitory computer-readable media as recited in claim 15, further comprising:

receiving a security code and transaction details from the checkout manager after a requested use of the borrowed payment instrument by the first user during the transaction; and approving the requested use at least partially in response to determining that the security code is valid for the borrowed payment instrument.

17. The one or more non-transitory computer-readable media as recited in claim 15, wherein the identification information includes at least one of a shipping address or a telephone number of the first user.

18. The one or more non-transitory computer-readable media as recited in claim 15, wherein the identification information is a common address shared between the first user and the second user.

19. A system, comprising:
one or more processors; and
memory to store instructions executable by the one or more processors, the instructions to store:
an account manager to make available for use a payment instrument of a lender by a lendee, the payment instrument having at least one restriction imposed on the lendee by the lender; and
a checkout manager in communication with the account manager to:
identify the payment instrument of the lender when the lendee initiates a transaction in an electronic marketplace;
identify at least one lendee-owned payment instrument as an alternate payment option for the lendee;
offer use of the payment instrument as consideration for the transaction in the electronic marketplace; and
request a security code from the lendee in lieu of an account number of the payment instrument to enable validation of the use of the payment instrument by the lendee as a valid payment transaction.

20. The system as recited in claim 19, further comprising a validation module to validate that the lendee is using the payment instrument in compliance with the at least one restriction imposed on the lendee by the lender.

21. The system as recited in claim 19, further comprising an authorization module to enable the lender to authorize or deny a payment request initiated by the lendee.

22. The system as recited in claim 19, further comprising a reporting module to report use of the payment instrument to the lender.

* * * * *